E. A. MILES.
STUMP PULLER.
APPLICATION FILED AUG. 17, 1914.
1,126,820.
Patented Feb. 2, 1915.
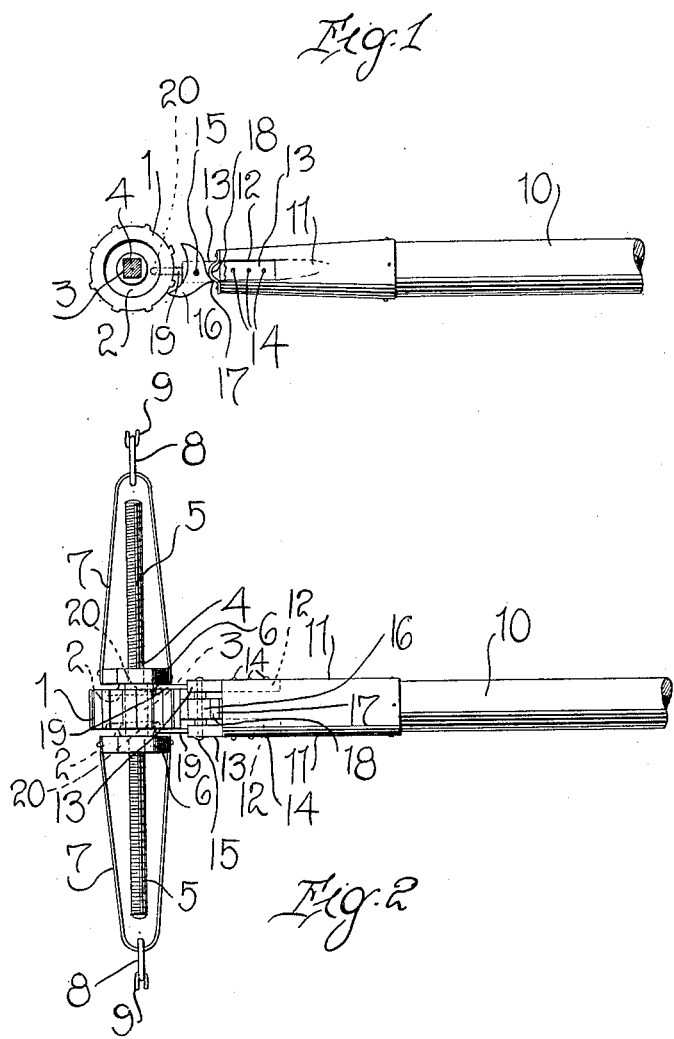
Inventor
E. A. Miles
Witnesses
Robert M. Sutphen
A. I. Hind
By Watson E. Coleman
Attorney

UNITED STATES PATENT OFFICE.

ELIAS A. MILES, OF TARKIO, MONTANA.

STUMP-PULLER.

1,126,820.  Specification of Letters Patent.  Patented Feb. 2, 1915.

Application filed August 17, 1914. Serial No. 857,214.

*To all whom it may concern:*

Be it known that I, ELIAS A. MILES, a citizen of the United States, residing at Tarkio, in the county of Missoula and State of Montana, have invented certain new and useful Improvements in Stump-Pullers, of which the following is a specification, reference being had to the accompanying drawings.

This invention relates to new and useful improvements in pulling devices and more particularly to what will be hereinafter known as a stump puller, the main object of the present invention being the provision of a device of this character constructed on the order of a turn buckle, wherein one end of the device is suitably secured to any form of anchor, while the other end thereof is attached to the stump or any article which is to be removed from its present position, the operation of the device being carried out by a ratchet wheel and a pivoted ratchet and actuated wheel.

Another object of the present invention is the provision of a stump pulling device of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claim.

In the accompanying drawing forming a part of this application, Figure 1 is a side elevation of a stump puller constructed in accordance with my invention, parts thereof being broken away and illustrated in section; and Fig. 2 is a top plan view.

In carrying out my invention, I provide a ratchet wheel 1, the opposed faces of which are provided with annular grooves 2, the purpose of which will be hereinafter more fully set forth, while the central portion of the ratchet wheel is provided with a substantially rectangular, centrally arranged opening 3, in which the longitudinal bar 4 is arranged, said bar being circular in form at its ends, as shown at 5 and provided with screw threads. Threaded upon the ends of the bar 4 are the nuts 6 and secured to opposite sides of these nuts are the U-shaped connecting members 7, which connect the nuts with the anchor and the device which is to be pulled or removed from its present position.

Mounted upon the U-shaped members 7, are the rings 8 and connected to these rings are the chains or cables 9, the opposite ends of which are secured, one to the anchor and one to the device to be operated upon. From this it will be apparent that upon turning movement of the ratchet 1, the shaft or bar 4 will be rotated within the nuts 6 and tend to move these nuts toward the ratchet wheel or center of the shaft 4. From this it will be apparent that by rotary movement of the gears 1, the stump or other device to which the puller is attached can be quickly and readily removed from its present standing position. In order to rotate the ratchet 1, I provide an operating device which is in the form of a lever 10, the outer end of which is provided with flattened faces 11 having longitudinally extending grooves 12 formed therein in which the ears 13 are arranged and secured therein by means of the screws 14, the outer ends of said arms projecting beyond the outer end of the handle member 10 and provided with alined openings to receive the transverse pivot pin 15.

Pivotally mounted upon the transverse pin 15 and arranged between the outer ends of the ears 13, is a double toothed pawl 16 which is adapted for engagement with the ratchet 1 upon the actuation of the lever 10 to rotate the ratchet and the shaft 4. Either one of the teeth of the pawl is adapted to be normally retained into engagement with the ratchet 1 by means of the spring 17 which is preferably a flat spring having its central portion bulged as shown at 18 and adapted for engagement with the inner end of the pawl. Secured to the inner faces of the arms 13 and projecting beyond the outer ends of the arms are the retaining members or arms 19, the outer ends of which are bent at right angles as shown at 20 and are adapted to be inserted within the grooves 2 in order to retain the lever and pawl in operative position with respect to the ratchet.

From the above description taken in connection with the accompanying drawings, it will be apparent that I have provided a simple and durable device whereby stumps or other articles of this character may be quickly and readily removed from their normal resting place and, at the same time, it will be noted that this device may be used for a great many useful purposes. It will be noted that the lever and the ratchet 1 are retained in their operative positions by means of the connecting arms 19 which are disposed upon opposite sides of the ratchet and the outer ends thereof arranged within the grooves 2. Thus, as the lever is actuated the ratchet 1 will be rotated, thereby rotating the shaft and pulling inwardly upon the U-shaped members 7. My improved stump puller as herein shown and described is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claim.

Having thus described this invention, what I claim is:—

A device of the class described including a shaft having its ends threaded, a ratchet wheel fixed in the center thereof, said ratchet wheel being provided with annular grooves upon opposite faces thereof, nuts movably mounted upon the threaded ends of the shaft, U-shaped connecting members having their ends fixed to opposite sides of the nuts, a lever, spaced ears carried by said lever, spaced arms integrally connected with the ears, hook portions formed at the outer ends of said arms providing retaining members having their outer ends disposed in opposed relation and adapted for engagement within the grooves in the ratchet, a pivot pin connecting the ears, a double toothed pawl mounted for pivotal movement upon said pin, adapted for engagement with the ratchet, a spring member carried by the outer end of the lever and adapted for engagement with the inner end of the pawl whereby upon the actuation of the lever, the pawl will engage the ratchet to move the nuts axially thereon, the hook portions of the retaining members working within the grooves as the ratchet revolves.

In testimony whereof I hereunto affix my signature in the presence of two witnesses.

ELIAS A. MILES.

Witnesses:
B. S. TARBOX,
MYRTLE B. TARBOX.

Copies of this patent may be obtained for five cents each, by addressing the "Commissioner of Patents, Washington, D. C."